United States Patent
Lavallée

(10) Patent No.: US 9,606,984 B2
(45) Date of Patent: Mar. 28, 2017

(54) UNSUPERVISED CLUSTERING OF DIALOGS EXTRACTED FROM RELEASED APPLICATION LOGS

(71) Applicant: Nuance Communications, Inc., Burlington, MA (US)

(72) Inventor: Jean-Francois Lavallée, Verdun (CA)

(73) Assignee: Nuance Communications, Inc., Burlington, MA (US)

( * ) Notice: Subject to any disclaimer, the term of this patent is extended or adjusted under 35 U.S.C. 154(b) by 320 days.

(21) Appl. No.: 13/969,825

(22) Filed: Aug. 19, 2013

(65) Prior Publication Data
US 2015/0051910 A1 Feb. 19, 2015

(51) Int. Cl.
*G10L 15/06* (2013.01)
*G06F 17/27* (2006.01)

(52) U.S. Cl.
CPC .......... *G06F 17/279* (2013.01); *G10L 15/063* (2013.01); *G10L 2015/0631* (2013.01); *G10L 2015/0633* (2013.01)

(58) Field of Classification Search
CPC ............... G10L 2015/0631; G10L 2015/0633
USPC .............................................. 704/9, 231, 245
See application file for complete search history.

(56) References Cited

U.S. PATENT DOCUMENTS

| | | | | |
|---|---|---|---|---|
| 5,873,056 | A * | 2/1999 | Liddy .................... | G06F 17/274 704/9 |
| 8,392,183 | B2 * | 3/2013 | Weber ................... | G11B 27/034 700/94 |
| 2008/0221892 | A1 * | 9/2008 | Nathan ................... | G06F 17/279 704/257 |
| 2010/0153219 | A1 * | 6/2010 | Mei ......................... | G06F 17/27 705/14.73 |
| 2011/0238409 | A1 * | 9/2011 | Larcheveque ...... | G06F 17/2785 704/9 |

OTHER PUBLICATIONS

"DATE: A Dialogue Act Tagging Scheme for Evaluation of Spoken Dialogue Systems", by Marilyn Walker, et al., *HLT 2001 Human Language Technology Conference*, Mar. 18-21, 2001, San Diego, California, pp. 1-8.
"OPTICS: Ordering Points to Identify the Clustering Structure", by Mihael Ankerst, et al., *SIGMOD*, 1999, Philadelphia, PA, pp. 49-60.

* cited by examiner

*Primary Examiner* — Shaun Roberts
(74) *Attorney, Agent, or Firm* — Hamilton, Brook, Smith & Reynolds, P.C.

(57) ABSTRACT

A natural language understanding system performs automatic unsupervised clustering of dialog data from a natural language dialog application. A log parser automatically extracts structured dialog data from application logs. A dialog generalizing module generalizes the extracted dialog data to generalization identifier vectors. A data clustering module automatically clusters the dialog data based on the generalization identifier vectors using an unsupervised density-based clustering algorithm without a predefined number of clusters and without a predefined distance threshold in an iterative approach based on a hierarchical ordering of the generalization.

18 Claims, 3 Drawing Sheets

US 9,606,984 B2

UNSUPERVISED CLUSTERING OF DIALOGS EXTRACTED FROM RELEASED APPLICATION LOGS

TECHNICAL FIELD

The invention relates to natural language processing applications, and more specifically to unsupervised clustering of application dialog information.

BACKGROUND ART

Natural language understanding (NLU) systems have been deployed in numerous applications which require some sort of interaction between humans and machines. Most of the time, the interaction is controlled by the machine which asks questions of the users and then attempts to identify the intended meaning from their answers (expressed in natural language), and then takes action in response to these extracted meanings.

One important use NLU technology is in automated dialog systems that manage human-machine interactions. FIG. 1 shows a typical NLU dialog system based on receiving input speech from a telephone caller that is translated into a text string by an Automated Speech Recognition (ASR) Module 101. The ASR text is output into an NLU semantic classification component known as a Statistical Router 102. The Statistical Router 102 models the NLU task as a statistical classification problem in which the ASR text corresponding to an utterance is assigned to one or more of a set of predefined user intents. Various specific classifiers have been compared in the literature with similar performance (1-2% differences in classification accuracy), including, for example, Boosting , Maximum Entropy (ME), and Support Vector Machines (SVM). For example, Statistical Router 102 may use binary unigram features and a standard back-propagation neural network as a classifier.

The Statistical Router 102 typically has an unacceptably high error rate (10-30% classification error rates are commonly reported in deployed applications), and thus a rejection mechanism is implemented to only retain those route hypotheses which are most likely to be correct. The rejection decision should not be based only on the confidence in the classification of the Statistical Classifier 102 because the ASR Module 101 can also make recognition errors which should be taken into account. Therefore, another separate classifier—Confidence Engine (CE) 103—is used to produce confidence scores based on both acoustic and NLU features to determine the highest ranked N hypotheses (typically 3-5) output from the Statistical Classifier 102. An Intent Reordering Component 104 then reorders the classification hypotheses according to their overall confidence as determined by the CE 103. The best scoring classification hypothesis is sent to a Threshold Decision Module 105 which accepts the hypothesis if its confidence score is above an accept threshold. The value of the accept threshold is chosen so that the system satisfies one or more operating constraints such as an upper bound on the False Accept Rate (FAR) (typically 1-5%).

NLU dialog applications also produce dialog data during their operation that is collected in a Dialog Information Database 106. That dialog data is later analyzed to improve the operating quality of the NLU application and others, and to help improve the development of new future NLU products. The dialog data also helps to identify and prioritize problems that need to be addressed, and to improve the statistical models that are used by the system. But these NLU dialog applications generate an enormous amount of data, and it is simply not reasonable to inspect every piece of collected information or even get an adequate coverage from random sampling of the data.

SUMMARY

Embodiments of the present invention are directed to natural language understanding systems, methods and computer program products for performing automatic unsupervised clustering of dialog data from a natural language dialog application. A log parser extracts structured dialog data from application logs. A dialog generalizing module automatically generalizes the extracted dialog data using different independent generalization methods to produce a generalization identifiers vectors aggregating the results of the generalization methods used. A data clustering module automatically clusters the dialog data based on the generalization identifier vectors using an unsupervised density-based clustering algorithm without a predefined number of clusters and without a predefined distance threshold.

A dialog information database can store the clustered dialog data. The data clustering module also may further post-process the clustered dialog data to add additional cluster characteristic information. The generalization identifiers typically include complex application state identifiers characterizing internal state of the dialog application. The clustering algorithm, e.g., an OPTICS algorithm, may flatten hierarchic data clusters and/or use an iterative clustering process.

DETAILED DESCRIPTION

Embodiments of the present invention are directed to performing automatic unsupervised clustering of dialog data from an NLU application to meaningfully organize the information gathered in the application data logs. Dialogs that share a similar structure and domain are regrouped together into dialog clusters based on application internal state and semantic information that is extracted from the standard data logs. Such an approach is completely unsupervised and does not require any data annotations. Nor is it necessary to specify any particular pre-defined number of expected dialog clusters or any pre-defined specific distance threshold. Complex dialog features that are not limited to the surface form can be used from a large number of logged dialogs in a relatively reasonable amount of time using an iterative approach based on a hierarchical ordering of the generalization.

Figure 1:
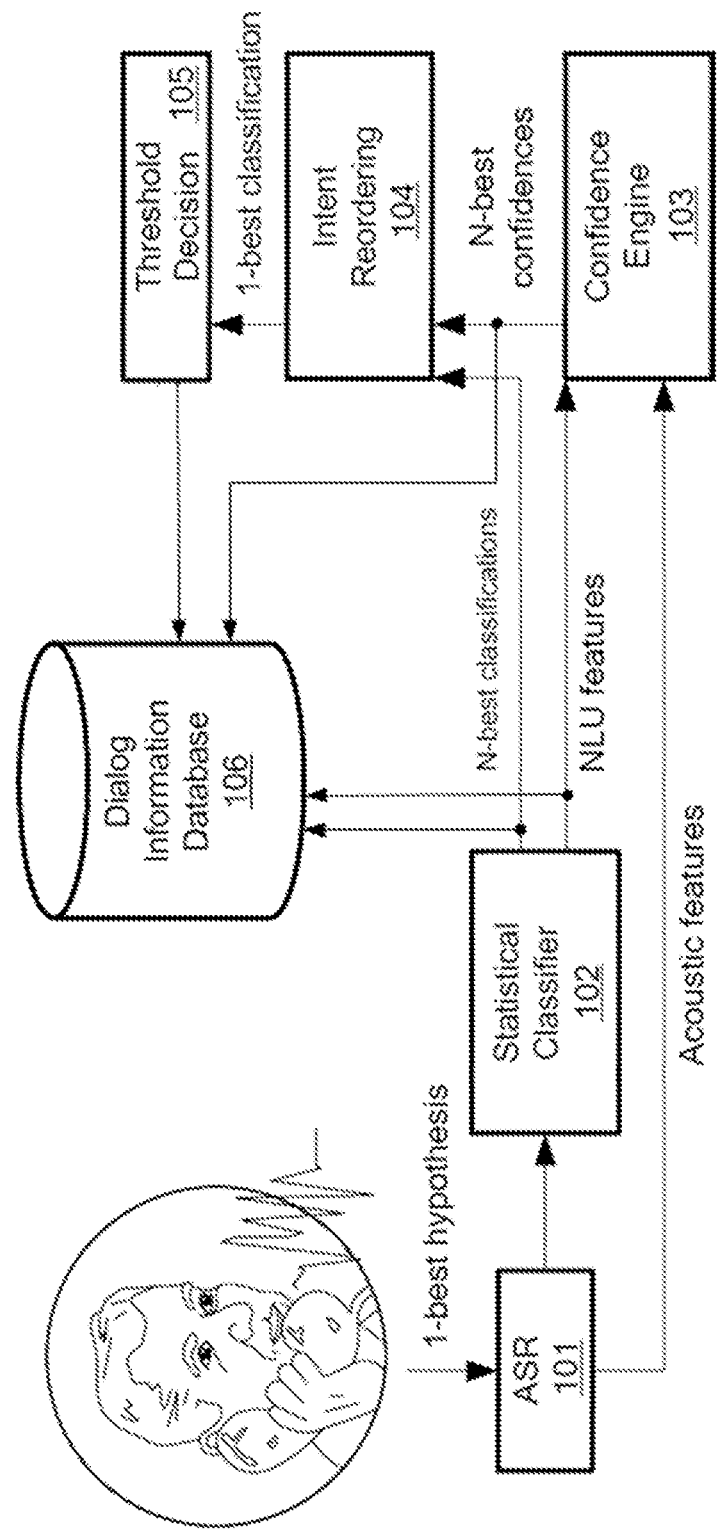
FIG. 1 shows an example of a typical NLU dialog system.
Figure 2:
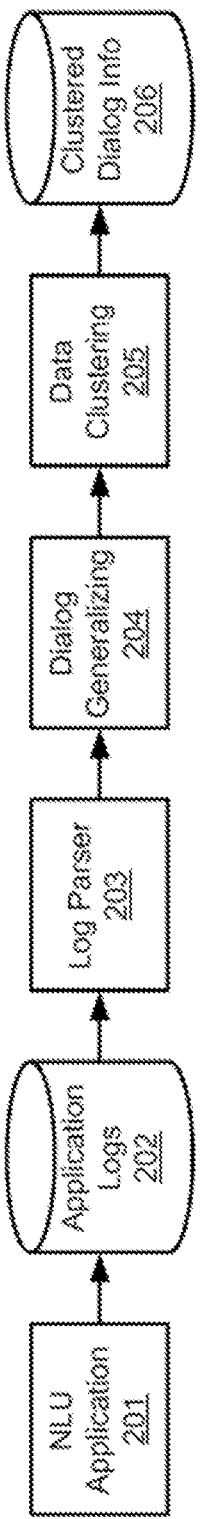
FIG. 2 shows an example of functional blocks in a dialog clustering system according to one embodiment of the present invention.
Figure 3:
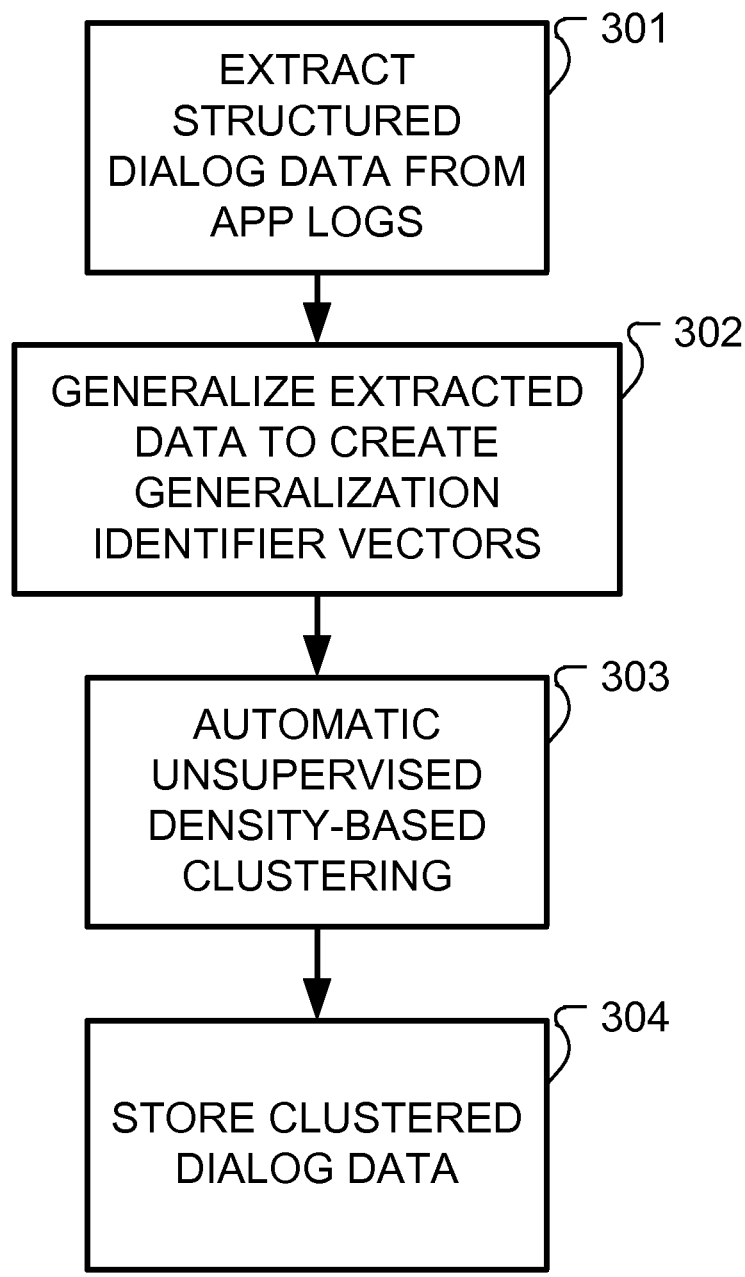
FIG. 3 shows various steps in a method of dialog clustering according to an embodiment of the present invention.

FIG. 2 an example of functional blocks in a dialog clustering system and FIG. 3 shows various steps in a method of dialog clustering according to embodiments of the present invention. As explained above, an NLU application 201 processes NLU dialogs with human users, generating application data logs 202 that record the dialogs potential surface form, semantic interpretation, and the internal application state at each turn of the process. A log parser 203 extracts structured dialog data from these data logs 202, step 301, to extract the dialogs and relevant associated information to a parsed log database or index such as a Lucene index, hadoop or sql database.

A dialog generalizing module 204 generalizes the extracted dialog data using different independent generalization methods, step 302, to produce a generalization identifier vectors by dialog aggregating the results of the generalization methods used. It is worth appreciating that the descriptive generalization identifiers are not limited to easily obtained information such as vocabulary and dialog structure representation, or even common complex information such as semantic features. The descriptive identifier information represented in the generalization identifier vectors can also use information on the internal state of the generating application (e.g., task completion status, information collection focus transition, etc.).

For a specific type of generalization, all the dialog data that generalizes the same will be attributed with the same generalization identifier. When the computation of each generalization type is computed, each dialog can be represented as a generalization identifier vector G of size T, where T is the number of different generalization types. The different generalization types are independent of each other and can be computed in parallel. For example, a specific example of a speech act-type approach may be useful for generalizing the extracted dialog data. Further detailed discussion of one specific arrangement of speech act generalization is provided in Walker et al., DATE: A Dialogue Act Tagging Scheme for Evaluation of Spoken Dialogue Systems, ACL, 2001, Toulouse, France, which is incorporated herein by reference.

Take an example of three dialogs and two different generalization types—"Speech act" (representing system status/dialog structure) and "Slot name" (representing a user acts/semantic value):

Dialog:

| Call Bob | Call John | Call Matthew |
|---|---|---|
| which one | which one | Ok I'm calling him |
| the second one | smith | |
| Ok I'm calling him | Ok I'm calling him | |

Speech act:

| Request-Intent-task | Request-Intent-task | Request-Intent-task |
|---|---|---|
| Request-Contact-task | Request-Contact-task | Inform-Intent-Com |
| Inform-Intent-Com | Inform-Intent-Com | |

Slot name:

| Intent | Intent | Intent |
|---|---|---|
| Contact | Contact | Contact |
| Position | | |

The resulting generalization identifier vector for the dialogs would be Dialog 1 <0,0>, Dialog 2 <0,1> (same speech act generalization as Dialog 1), and Dialog 3 <1,1> (same slot name generalization as Dialog 2).

A data clustering module 205 automatically clusters the dialog data, step 303, based on the generalization identifier vectors using an unsupervised density-based clustering algorithm without a predefined number of clusters and without a predefined distance threshold to generate hierarchical datapoints clusters. One example of such a density-based clustering algorithm is an OPTICS algorithm such as described in greater detail in Ankerst et al., *OPTICS: Ordering Points To Identify the Clustering Structure*, SIGMOD, 1999, Philadelphia, Pa., which is incorporated herein by reference. The clustered dialog data is then stored in a dialog information database 206, step 304. The clustered dialog data in the dialog information database 206 can then be used in conjunction with the data logs 202 in the end user application.

In this particular context, there are a number of advantages to using a density-based clustering approach over the more usual K-means and single-linkage/dendogram algorithms. A density-based algorithm does not need the number of clusters to be pre-defined (which would be impossible to do in this context) as necessary with k-means algorithms, nor is a strict pre-defined distance threshold needed as with a single linkage algorithm. A strict threshold would tend to under-cluster large dialogs while over-clustering small ones, whereas a density-based approach is much less sensitive to that. A density-based algorithm also allows for hierarchical clustering, unlike with a k-means algorithm.

The distance between two given dialogs can be given by the average distance between the generalization information in their respective generalization identifier vectors. That average distance can be normalized to a value in a pre-established interval (e.g., 0 to 1). That allows use of a more generic algorithm because the domain of the distance is known so that parameterization is not needed. The distance calculation can be pre-computed and cached and re-used. Not all distance functions are adapted to all types of generalization. One distance function that has been used successfully is a normalized Levensthein distance (edit distance) for the structure generalization and a cosine or Jaccard distance for the semantic generalization. This results in the following formula between two generalization vectors G1 and G2 of size T, where F is a vector of distance function of size T $$dist(G1, G2, F) = \frac{\sum_{i}^{T} F_i(G1_i, G2_i)}{T}$$

From the previous example, the distance between Dialog 1 and Dialog 2 would be given by:

(NormalizedLeventsthein(SpeechActGen(0), SpeechActGen(0))+Cosine(SlotNameGen(0), SlotNameGen(1)))/2 and the distance between Dialog 1 and Dialog 3 would be given by:

(NormalizedLeventsthein(SpeechActGen(0), SpeechActGen(1))+Cosine(SlotNameGen(0), SlotNameGen(1)))/2

Using such distance functions and calculations, the data clustering module 205 can use a density-based clustering algorithm such as OPTICS algorithm to build a reachability graph where the x-axis represents the ordered datapoints to cluster and the y-axis is the reachability distance. The valleys in the reachability graph are the dialog clusters that can be extracted. This produces a standard hierarchical clustering representation where a cluster might be contained in another more generic cluster. The cluster representation is then flattened so that all dialogs are contained in at most one dialog. To flatten the clustering, we identify the most cohesive cluster from which the dialogs are grouped together. By definition, the most cohesive cluster will contain no sub-clusters in the hierarchical clustering but it might be part of a more generic cluster. If that is the case, the sub-cluster datapoints are removed from its parent cluster. The parent cluster could be divided in several smaller cluster if the removed datapoints were necessary to maintain sufficient density between parts of the cluster. The clusters can be dissolved if not enough datapoints remain. The minimal cluster size may be determined by the data clustering module 205. Those steps are repeated until all datapoints are in either a retained or disbanded cluster. The datapoints in a disbanded cluster are considered outliers and are retained as such in the database. These outliers are often dialogs that ended badly or that were outside of the scope intended by the developers, and as such they are particularly interesting.

Computing a dialog cluster can be computationally costly given that the worst-case run time complexity is quadratic, $O(n^2)$(actually closer to $O(\log n)$ given typical optimization of the OPTICS algorithm), and also there may be a large amount of information in the application logs. By trading off some precision, this can be improved by performing an iterative clustering that takes advantage of the hierarchical nature of the generalization. In such an approach, the dialogs are clustered by a single generalization type per iteration, starting with the more generic, in order to prune many of the potential combinations. As the number of dialogs increases, the number of generalizations does not rise as fast, increasing the probability that the generalization of a new dialog has been seen before. The more generic the generalization type, the higher the probability. The clustering can also be parallelized as it is straightforward to combine the clustering result just by putting in the same cluster all dialogs found together in all generalization type clusters. The identification of the generalization type hierarchy also does not necessitate any human input. The number of different representations of the generalization type found in the data logs can be automatically calculated, where a low number usually indicates a generic representation. A more robust approach can be taken by using the entropy of the generalization type where a lower entropy would indicate a more generic generalization of the dialog and would better handle cases where the dialog distribution in the different generalization representations would be highly unequal.

This suggests that the generalization can be ordered from more generic to less generic. The most generic unclustered generalization type can be clustered using the density-based clustering algorithm with lax clustering parameters. Once the cluster from that type is formed, the next most generic generalization type can be used to independently cluster each previously obtained cluster. This continues iteratively for each generalization type either until some desired number of iterations occurs or until some condition on the number or size of the cluster is reached.

In some cases where the application of the clustering results would gain from more cohesive and easy to interpret clusters at the cost of coverage, it may useful to perform a further post-treatment of the cluster that looks for information that by its presence or absence is characteristic of the cluster. Such cluster characteristic information usually is not the generalization type used for clustering, but rather may be the information that was used to build it (particular semantic value, speech act, particular task or vocabulary . . . ). In addition, some types of other information not used for generalization can also be evaluated (e.g., user country of origin, age, etc.). This post-treatment can be particularly useful where the information is intended to be presented to humans.

The identification of the cluster characteristic information is done by comparing the distribution of the characteristic in the dialog of the cluster to the distribution of the characteristic in all dialogs (or a representative sample of those dialogs) and retaining the characteristic whose distribution diverge significantly in the cluster. Various specific metrics can be used such as a normalized point-wise mutual information or modeling a binomial distribution and using the cumulative distribution function $CDF(x, n, p)$, where x is the number of dialogs containing the characteristic, n is the cluster size, and p is the probability that a dialog contains the characteristic empirically observed in all dialogs. Using the selected metric, for a given cluster the most representative characteristic or combination of characteristics are identified and then added to the cluster description. The cluster elements that do not fit the resulting description are removed and put into a separate cluster. This step can be repeated for some given amount of time either until no characteristic is particular enough to the cluster or a given cluster size is reached. This results in a series of smaller clusters that are easier for a human observer to conceptualize and from which we can produce an easy to understand summary given by the characteristics shared by all the dialogs in the cluster.

The clustered dialog information can be integrated into a log visualization interface for developers of new NLU applications as a tool to help guide annotation of application training data and reduce the amount annotations needed by selecting cases that maximize coverage. Embodiments also help promote an application developer fix software bugs and otherwise improve a given NLU application by identifying abnormal dialogs by detecting outliers, identifying relevant logs and/or by extracting relevant metrics from the log data for training of specific components.

Embodiments of the invention may be implemented in whole or in part in any conventional computer programming language. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A natural language understanding system using at least one hardware implemented computer processor for automatic unsupervised clustering of dialog data from a natural language dialog application, the arrangement comprising:
   a log parser configured to extract structured dialog data from application logs, the structured dialog data including a transcription of a dialog between a user and the natural language dialog application, the transcription being generated by the natural language dialog application;
   a dialog generalizing module configured to automatically generalize the extracted dialog data using different independent generalization methods to produce generalization identifier vectors aggregating the results of the generalization methods used, the generalization identifier vectors indicating descriptive categories of the different independent generalization methods that correspond to statements by the user and statements by the natural language dialog application included in the extracted dialog data; and
   a data clustering module configured to automatically cluster the dialog data based on the generalization identifier vectors using an unsupervised density-based clustering algorithm without a predefined number of clusters and without a predefined distance threshold.

2. The system according to claim 1, further comprising:
   a dialog information database configured to store the clustered dialog data.

3. The system according to claim 1, wherein the generalization identifier vectors include sequences of application state identifiers characterizing internal transition of the state of the dialog application.

4. The system according to claim 1, wherein the data clustering module further post-processes the clustered dialog data to add additional cluster characteristic information.

5. The system according to claim 1, wherein the clustering algorithm flattens hierarchic clusters of dialog data.

6. The system according to claim 1, wherein the clustering algorithm is an iterative clustering algorithm.

7. A computer-implemented method using at least one hardware implemented computer processor for automatic unsupervised clustering of dialog data from a natural language dialog application, the method comprising:
   automatically generalizing structured dialog data extracted from application logs using different independent generalization methods to produce generalization identifier vectors aggregating the results of the generalization methods used, the structured dialog data including a transcription of a dialog between a user and the natural language dialog application, the transcription being generated by the natural language dialog application, the generalization identifier vectors indicating descriptive categories of the different independent generalization methods that correspond to statements by the user and statements by the natural language dialog application included in the extracted dialog data; and
   automatically clustering the dialog data based on the generalization identifier vectors using an unsupervised density-based clustering algorithm without a predefined number of clusters and without a predefined distance threshold.

8. The method according to claim 7, further comprising:
   storing the clustered dialog data in a dialog information database.

9. The method according to claim 7, wherein the generalization identifiers include sequences of application state identifiers characterizing internal transition of the state of the dialog application.

10. The method according to claim 7, post-processing the clustered dialog data to add additional cluster characteristic information.

11. The method according to claim 7, wherein the clustering algorithm flattens hierarchic clusters of dialog data.

12. The method according to claim 7, wherein the clustering algorithm is an iterative clustering algorithm.

13. A computer program product encoded in a non-transitory computer-readable medium for automatic unsupervised clustering of dialog data from a natural language dialog application, the product comprising:
   program code for automatically generalizing structured dialog data extracted from application logs using different independent generalization methods to produce generalization identifier vectors aggregating the results of the methods used, the structured dialog data including a transcription of a dialog between a user and the natural language dialog application, the transcription being generated by the natural language dialog application, the generalization identifier vectors indicating descriptive categories of the different independent generalization methods that correspond to statements by the user and statements by the natural language dialog application included in the extracted dialog data; and
   program code for automatically clustering the dialog data based on the generalization identifier vectors using an unsupervised density-based clustering algorithm without a predefined number of clusters and without a predefined distance threshold.

14. The product according to claim 13, further comprising:
   program code for storing the clustered dialog data in a dialog information database.

15. The product according to claim 13, wherein the generalization identifiers include sequences of application state identifiers characterizing internal transition of the state of the dialog application.

16. The product according to claim 13, program code for post-processing the clustered dialog data to add additional cluster characteristic information.

17. The product according to claim 13, wherein the clustering algorithm flattens hierarchic clusters of dialog data.

18. The product according to claim 13, wherein clustering algorithm is an iterative clustering algorithm.

* * * * *